(12) United States Patent
Lloyd et al.

(10) Patent No.: US 8,666,740 B2
(45) Date of Patent: Mar. 4, 2014

(54) SPEECH AND NOISE MODELS FOR SPEECH RECOGNITION

(75) Inventors: Matthew I. Lloyd, Cambridge, MA (US); Trausti T. Kristjansson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 13/530,614

(22) Filed: Jun. 22, 2012

(65) Prior Publication Data
US 2012/0259631 A1    Oct. 11, 2012

Related U.S. Application Data

(63) Continuation of application No. 13/250,777, filed on Sep. 30, 2011, now Pat. No. 8,249,868, which is a continuation of application No. 12/814,665, filed on Jun. 14, 2010, now Pat. No. 8,234,111.

(51) Int. Cl.
*G10L 15/20* (2006.01)

(52) U.S. Cl.
USPC ........... 704/233; 704/231; 704/235; 704/244; 704/251; 704/255

(58) Field of Classification Search
USPC .................. 704/233, 244, 255, 235, 251, 231
See application file for complete search history.

(56) References Cited

U.S. PATENT DOCUMENTS

| | | | |
|---|---|---|---|
| 5,970,446 A * | 10/1999 | Goldberg et al. | ............. 704/233 |
| 6,718,302 B1 | 4/2004 | Wu et al. | |
| 2003/0220791 A1 | 11/2003 | Toyama | |
| 2004/0215454 A1 * | 10/2004 | Kobayashi et al. | ........... 704/231 |
| 2007/0198255 A1 | 8/2007 | Fingscheidt et al. | |
| 2007/0233480 A1 * | 10/2007 | Koshiba | ........................ 704/243 |
| 2008/0052062 A1 | 2/2008 | Stanford | |
| 2008/0270127 A1 | 10/2008 | Kobayashi et al. | |
| 2009/0006088 A1 | 1/2009 | Gajic et al. | |
| 2009/0119103 A1 | 5/2009 | Gerl et al. | |
| 2010/0145687 A1 | 6/2010 | Huo et al. | |

OTHER PUBLICATIONS

T. Kristjansson et al., 'Super-Human Multi-Talker Speech Recognition: The IBM 2006 Speech Separation Challenge System,' IBM Watson Research Center, Yorktown Heights, NY 105, 2006.
Ron J. Weiss, 'Underdetermined Source Separation Using Speaker Subspace Models,' Thesis, Columbia University, 2009.
International Search Report and Written Opinion for International Application No. PCT/US2011/040225, mailed Aug. 12, 2011, 14 pages.

(Continued)

*Primary Examiner* — Qi Han
(74) *Attorney, Agent, or Firm* — Fish & Richardson P.C.

(57) ABSTRACT

An audio signal generated by a device based on audio input from a user may be received. The audio signal may include at least a user audio portion that corresponds to one or more user utterances recorded by the device. A user speech model associated with the user may be accessed and a determination may be made background audio in the audio signal is below a defined threshold. In response to determining that the background audio in the audio signal is below the defined threshold, the accessed user speech model may be adapted based on the audio signal to generate an adapted user speech model that models speech characteristics of the user. Noise compensation may be performed on the received audio signal using the adapted user speech model to generate a filtered audio signal with reduced background audio compared to the received audio signal.

19 Claims, 4 Drawing Sheets

(56) References Cited

OTHER PUBLICATIONS

Frey, B.J., et al., 'ALGONQUIN: Iterating Laplace's Method to Remove Multiple Types of Acoustic Distortion for Robust Speech Recognition,' Proceedings of Eurospeech, vol. 2, 2001, 4 pages.
Office Action issued in U.S. Appl. No. 13/250,777 dated Nov. 23, 2011, 21 pages.
Office Action issued in U.S. Appl. No. 12/814,665 dated Nov. 25, 2011, 23 pages.
Notice of Allowance issued in U.S. Appl. No. 12/814,665 dated Apr. 3, 2012, 8 pages.
Notice of Allowance issued in U.S. Appl. No. 13/250,777 dated Apr. 20, 2012. 8 pages.

\* cited by examiner

SPEECH AND NOISE MODELS FOR SPEECH RECOGNITION

CROSS-REFERENCE TO RELATED APPLICATIONS

This application is a continuation of and claims priority from U.S. patent application Ser. No. 13/250,777, filed on Sep. 30, 2011, which is a continuation of U.S. patent application Ser. No. 12/814,665, filed on Jun. 14, 2010. The contents of both applications are incorporated herein by reference in their entirety.

BACKGROUND

This specification relates to speech recognition.

Speech recognition may be used for voice search queries. In general, a search query includes one or more query terms that a user submits to a search engine when the user requests the search engine to execute a search. Among other approaches, a user may enter query terms of a search query by typing on a keyboard or, in the context of a voice query, by speaking the query terms into a microphone of, for example, a mobile device.

When submitting a voice query through, for example, a mobile device, the microphone of the mobile device may record ambient noises or sounds, otherwise referred to as "environmental audio" or "background audio," in addition to spoken utterances of the user. For example, environmental audio may include background chatter or babble of other people situated around the user, or noises generated by nature (e.g., dogs barking) or man-made objects (e.g., office, airport, or road noise, or construction activity). The environmental audio may partially obscure the voice of the user, making it difficult for an automated speech recognition ("ASR") engine to accurately recognize spoken utterances.

SUMMARY

In one aspect, a system includes one or more processing devices and one or more storage device storing instructions that, when executed by the one or more processing devices, cause the one or more processing devices to receive an audio signal generated by a device based on audio input from a user, the audio signal including at least a user audio portion that corresponds to one or more user utterances recorded by the device; access a user speech model associated with the user; determine that background audio in the audio signal is below a defined threshold; in response to determining that the background audio in the audio signal is below the defined threshold, adapt the accessed user speech model based on the audio signal to generate an adapted user speech model that models speech characteristics of the user; and perform noise compensation on the received audio signal using the adapted user speech model to generate a filtered audio signal with reduced background audio compared to the received audio signal.

Implementations may include one or more of the following features. For example, the audio signal may include an environmental audio portion that corresponds only to background audio surrounding the user and, to determine that the background audio in the audio signal is below a defined threshold, the instructions may include instructions that, when executed, cause the one or more processing devices to determine an amount of energy in the environmental audio portion; and determine that the amount of energy in the environmental audio portion is below a threshold energy. To determine that the background audio in the audio signal is below a defined threshold, the instructions include instructions that, when executed, cause the one or more processing devices to determine a signal-to-noise ratio of the audio signal; and determine that the signal to noise ratio is below a threshold signal-to-noise ratio. The audio signal may include an environmental audio portion that corresponds only to background audio surrounding the user and, to determine the signal-to-noise ratio of the audio signal, the instructions include instructions that, when executed, cause the one or more processing devices to determine an amount of energy in the user audio portion of the audio signal; determine an amount of energy in the environmental audio portion of the audio signal; and determine the signal-to-noise ratio by determining the ratio between the amount of energy in the user audio portion and the environmental audio portion.

The accessed user speech model may include a surrogate user speech model that has not been adapted to model the speech characteristics of the user. The instructions may include instructions that, when executed by the one or more processing devices, cause the one or more processing devices to select the surrogate user speech model; and associate the surrogate speech model with the user. To select the surrogate user speech model, the instructions may include instructions that, when executed by the one or more processing devices, cause the one or more processing devices to determine a gender of the user; and select the surrogate user speech model, from among multiple surrogate user speech models, based on the gender of the user. To select the surrogate user speech model, the instructions may include instructions that, when executed by the one or more processing devices, cause the one or more processing devices to determine a location of the user when the one or more utterances are recorded; and select the surrogate user speech model, from among multiple surrogate user speech models, based on the location of the user when the one or more utterances are recorded. To select the surrogate user speech model, the instructions may include instructions that, when executed by the one or more processing devices, cause the one or more processing devices to determine a language or accent of the user; and select the surrogate user speech model, from among multiple surrogate user speech models, based on the language or accent. To select the surrogate user speech model, the instructions may include instructions that, when executed by the one or more processing devices, cause the one or more processing devices to receive an initial audio signal that includes at least an initial user audio portion that corresponds to one or more user utterances recorded by the device; determine similarity metrics between multiple surrogate user speech models and an expected user speech model for the user determined based on the initial audio signal; and select the surrogate user speech model, from among the multiple surrogate user speech models, based on the similarity metrics.

The instructions may include instructions that, when executed, cause the one or more processing devices to access a noise model associated with the user; and wherein, to perform noise compensation, the instructions may further include instructions that cause the one or more processing devices to perform noise compensation on the received audio signal using the adapted user speech model and the accessed noise model. To perform noise compensation, the instructions may include instructions that cause the one or more processing devices to adapt the accessed noise model based on the received audio signal to generate an adapted noise model that models characteristics of background audio surrounding the user; and perform noise compensation on the received audio signal using the adapted user speech model and the adapted noise model. The instructions may include instructions that, when executed, cause the one or more processing devices to receive a second audio signal that includes at least a second user audio portion that corresponds to one or more user utterances recorded by the device; determine that background audio in the second audio signal is above the defined threshold; and in response to determining that the background audio in the second audio signal is above the defined threshold, adapt the noise model associated with the user based on the second audio signal to generate an adapted noise model that models characteristics of background audio surrounding the user. The accessed noise model may include a surrogate noise model that has not been adapted to model characteristics of background audio surrounding the user.

The instructions may include instructions that, when executed by the one or more processing devices, cause the one or more processing devices to select the surrogate noise model; and associate the surrogate noise model with the user. To select the surrogate noise model, the instructions may include instructions that, when executed by the one or more processing devices, cause the one or more processing devices to receive an initial audio signal that includes at least an initial user audio portion that corresponds to one or more user utterances recorded by the device; determine a location of the user when the one or more utterances corresponding to the initial user audio portion are recorded; and select the surrogate noise model, from among multiple surrogate noise models, based on the location of the user when the one or more utterances corresponding to the initial user audio portion are recorded.

To select the surrogate noise model, the instructions may include instructions that, when executed by the one or more processing devices, cause the one or more processing devices to receive an initial audio signal that includes at least an initial user audio portion that corresponds to one or more user utterances recorded by the device; determine similarity metrics between multiple surrogate noise models and an expected noise model for the user determined based on the initial audio signal; and select the surrogate noise model, from among the multiple surrogate noise models, based on the similarity metrics. Each of the multiple surrogate noise models may model characteristics of background audio in a particular location. Each of the multiple surrogate noise models may model characteristics of background audio in a particular kind of environmental condition.

To access the noise model, the instructions may include instructions that, when executed by the one or more processing devices, cause the one or more processing devices to determine a location of the user when the one or more utterances are recorded; and select the noise model, from among multiple noise models, based on the location of the user.

The audio signal may correspond to a voice search query and the instructions include instructions that, when executed by the one or more processing devices, cause the one or more processing devices to perform speech recognition on the filtered audio signal to generate one or more candidate transcriptions of the one or more user utterances; execute a search query using the one or more candidate transcriptions to generate search results; and send the search results to the device.

In another aspect, a system includes a client device and an automated speech recognition system. The client device is configured to send, to the automated speech recognition system, an audio signal that includes at least a user audio portion that corresponds to one or more user utterances recorded by the device. The automated speech recognition system is configured to receive the audio signal from the client device; access a user speech model associated with the user; determine that background audio in the audio signal is below a defined threshold; in response to determining that the background audio in the audio signal is below the defined threshold, adapt the accessed user speech model based on the audio signal to generate an adapted user speech model that models speech characteristics of the user; and perform noise compensation on the received audio signal using the adapted user speech model to generate a filtered audio signal with reduced background audio compared to the received audio signal.

Implementations may include the following features. For example, the automated speech recognition system may be configured to perform speech recognition on the filtered audio signal to generate one or more candidate transcriptions of the one or more user utterances. The system may include a search engine system configured to execute a search query using the one or more candidate transcriptions to generate search results; and send the search results to the client device.

In another aspect, a method includes receiving an audio signal generated by a device based on audio input from a user, the audio signal including at least a user audio portion that corresponds to one or more user utterances recorded by the device; accessing a user speech model associated with the user; determine that background audio in the audio signal is below a defined threshold; in response to determining that the background audio in the audio signal is below the defined threshold, adapting the accessed user speech model based on the audio signal to generate an adapted user speech model that models speech characteristics of the user; and performing noise compensation on the received audio signal using the adapted user speech model to generate a filtered audio signal with reduced background audio compared to the received audio signal.

Implementations of the described techniques may include hardware, a method or process, or computer software on a computer-accessible medium.

The details of one or more implementations are set forth in the accompanying drawings and the description below. Other features will be apparent from the description and drawings, and from the claims.

The details of one or more implementations are set forth in the accompanying drawings and the description below. Other potential features, aspects, and advantages will become apparent from the description, the drawings, and the claims.

DETAILED DESCRIPTION

Figure 1:
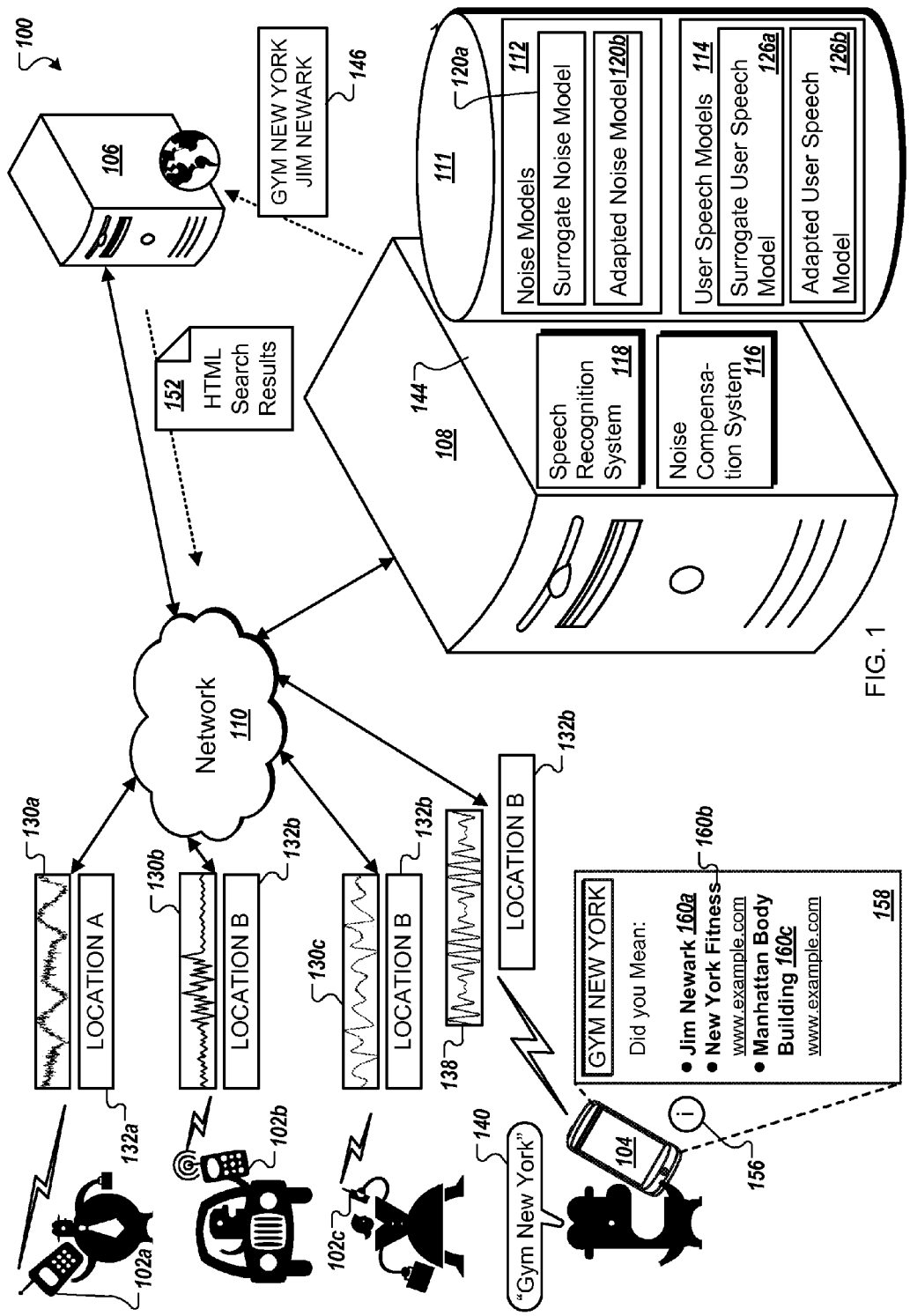
FIG. 1 is a diagram of an example system that supports voice search queries.

FIG. 1 is a diagram showing an example of a system 100 that supports voice search queries. The system 100 includes a search engine 106 and an automatic speech recognition (ASR) engine 108, which are connected to a set of mobile devices 102a-102c and a mobile device 104 by one or more networks 110 such as, in some examples, a wireless cellular network, a wireless local area network (WLAN) or Wi-Fi network, a Third Generation (3G) mobile telecommunications network, a private network such as an intranet, a public network such as the Internet, or some combination thereof).

In general, a user of a device, such as mobile device 104, may speak a search query into a microphone of the mobile device 104. An application running on the mobile device 104 records the user's spoken search query as an audio signal and sends the audio signal to the ASR engine 108 as part of a voice search query. After receipt of the audio signal corresponding to the voice search query, the ASR engine 108 can translate or transcribe the user utterances in the audio signal into one or more textual, candidate transcriptions, and can provide those candidate transcriptions as query terms to the search engine 106, thus enabling an audio search functionality for the mobile device 104. The query terms may include one or more whole or partial words, characters, or strings of characters.

The search engine 106 can use the search query terms to provide search results (e.g., Uniform Resource Identifiers (URIs) of web pages, images, documents, multimedia files, etc.) to the mobile device 104. For instance, the search results may include a Uniform Resource Identifier (URI) that references a resource that the search engine determines to be responsive to the search query. The search results may include, additionally or alternative, other items, such as a title, preview image, user rating, map or directions, description of the corresponding resource, or a snippet of text that has been automatically or manually extracted from, or otherwise associated with, the corresponding resource. The search engine 106, in some examples, can include a web search engine used to find references within the Internet, a phone book type search engine used to find businesses or individuals, or another specialized search engine (e.g., entertainment listings such as restaurants and movie theater information, medical and pharmaceutical information, etc.).

As an example of an operation of system 100, an audio signal 138 is in included in a voice search query that is sent from the mobile device 104 to the ASR engine 108 through the network 110. The audio signal 138 contains utterances 140 of "Gym New York." The ASR engine 108 receives the voice search query that includes the audio signal 138. The ASR engine 108 processes the audio signal 138 to generate one or more textual candidate transcription or a ranked set of textual candidate transcriptions 146 matching the utterance detected within the audio signal 138. For example, the utterances in the audio signal 138 may result in "Gym New York" and "Jim Newark" as candidate transcriptions 146.

One or more of the candidate transcriptions 146 generated by the speech recognition system 118 are passed to the search engine 106 from the ASR engine 108 as search query terms. The search engine 106 supplies the search query terms 146 to a search algorithm to generate one or more search results. The search engine 106 provides a set of search results 152 (e.g., Uniform Resource Identifiers (URIs) of web pages, images, documents, multimedia files, etc.) to the mobile device 104.

The mobile device 104 displays the search results 152 in a display area. As illustrated in a screen shot 158, the utterances "Gym New York" 140 generated three search results 160: "Jim Newark" 160a, "New York Fitness" 160b, and "Manhattan Body Building" 160c. The first search result 160a corresponds to the candidate transcription Jim Newark and, for example, may provide the user with a phone number or, when selected, may automatically dial Jim Newark using the mobile device 104. The final two search results 160b and 160c correspond to the candidate transcription "Gym New York" and include web page URIs. The candidate transcriptions and/or the search results may be ranked based a confidence measurement produced by the ASR 108 that indicates a confidence level that a given candidate transcription accurately corresponds to the utterance(s) in an audio signal.

To translate or transcribe the user utterances in the audio signal into one or more textual, candidate transcriptions, the ASR engine 108 includes a noise compensation system 116, a speech recognition system 118, and a datastore 111 that stores noise models 112 and user speech models 114. The speech recognition system 118 performs speech recognition on an audio signal to recognize user utterances in the audio signal and translate those utterances into the one or more textual, candidate transcriptions. In some implementations, the speech recognition system 118 may generate multiple candidate transcriptions for a given utterance. For example, the speech recognition system 118 can transcribe an utterance to multiple terms and can assign a confidence level associated with each transcription of the utterance.

In some implementations, a particular variation of the speech recognition system 118 may be chosen for a given audio signal based on additional, contextual information related to the audio signal and the chosen variation may be used to transcribe utterances in the audio signal. For example, along with an audio signal containing user utterances, in some implementations a voice search query can include regional or language information that is used to select a variant of the speech recognition system 118. In a particular example, the region in which the mobile device 104 is registered or the language setting of the mobile device 104 can be provided to the ASR engine 108 and used by the ASR engine 108 to determine the likely language or accent of the user of the mobile device 104. A variation of the speech recognition system 118 can be selected and used based upon the anticipated language or accent of the user of the mobile device 104.

The ASR engine 108 can apply the noise compensation system 116 to the audio signal received from, for example, mobile device 104 prior to performing speech recognition. The noise compensation system 116 may remove or reduce the background or environmental audio in the audio signal to produce a filtered audio signal. Because the microphone of the mobile device 104 may capture environmental audio in addition to utterances of the user, the audio signal may contain a mixture of the utterance(s) of the user as well as environmental audio. The audio signal therefore may be composed of one or more environmental audio signals that include only the environmental audio, as well as a user audio signal that includes the user's utterances (and potentially environmental audio). In general, environmental audio may include any ambient sounds that occur (naturally or otherwise) around the user. Environmental audio typically excludes the sounds, utterances, or voice of the user of the mobile device. The speech recognition system 118 may perform speech recognition on the filtered audio signal produced by the noise compensation system 116 to transcribe the user utterances. In some instances, performing speech recognition on the filtered audio signal may produce more accurate transcriptions than performing speech recognition directly on the received audio signal.

For a given audio signal, the noise compensation system 116 uses one of the noise models 112 and one of the user speech models stored in datastore 111 to remove or reduce the background or environmental audio in the audio signal. The noise models 112 include surrogate noise models 120 and adapted noised models 120b. Similarly, the user speech models include surrogate user speech models 126a and adapted user speech models 126b. In general, the adapted noise models 120b and adapted user speech models 126b are specific to a particular user and have been adapted to that user based on the audio signals received with previous voice search queries from that user. The surrogate noise models 120a and surrogate user speech models 126a are used, respectively, when there is no adapted noise model or adapted user speech model for the particular user that submitted the current voice search query.

In some instances, the performance of the noise compensation system 116 may be improved by using an adapted user speech model that has been trained or otherwise adapted to the specific speech characteristics of the particular user that submitted the voice search query. However, to adapt a speech model to a particular user, samples of that user's speech may be needed. In an environment such as the system 100, those samples may not be readily available initially. Thus, in one implementation, the ASR 108 selects a surrogate user speech model from one or more surrogate user speech models 126*a* when a user initially sends a voice search query or if there is not an adapted user speech model for that user for some other reason. The selected surrogate user speech model may be a user speech model that is determined to be a reasonable approximation of the user's speech characteristics. The selected surrogate user speech model is used to perform the noise compensation on the initial audio signal. As the user submits subsequent voice search queries, some or all of the audio signals sent with those subsequent queries are used to train or otherwise adapt the selected surrogate user speech model into an adapted user speech model that is specific to that user (that is, models the speech characteristics of the user), which is used for the noise compensation of those subsequent audio signals.

For example, in one implementation, when a subsequent audio signal is received, the ASR 108 determines whether the environmental or background audio is below a certain threshold. If so, then the audio signal is used to adapt the surrogate user speech model, or further adapt an adapted user speech model, to the particular user. If the background audio is above the threshold, then the audio signal is not used to adapt the user speech model (but may be used to adapt a noise model, as described below).

The user speech models (whether surrogate 126*a* or adapted 126*b*) may be implemented as, for example, a Hidden Markov Model (HMM) or a Gaussian Mixture Model (GMM). The user speech models may be trained or otherwise adapted using an Expectation-Maximization algorithm.

In some implementations, the user may be identified specifically. For example, some implementations may prompt the user for an identity before a search query is accepted. Other implementations may identify the user implicitly using other available information, such as typing patterns of the user or movement patterns of the user (e.g., when an accelerometer forms part of the device). When the user can be identified specifically, the adapted user speech models may be indexed by a user identifier that corresponds to the identified user.

In other implementations, the user may not be able to be identified specifically. In this case, the device used to enter the voice search query, such as mobile device 104, may be used as an identifier for a specific user and the adapted user speech models may be indexed based on a device identifier that corresponds to the device used to submit the voice search query. In environments in which there is normally only a single or primary user of the device, for example when a mobile phone is used as the input device, developing adapted user speech models on a device basis may provide acceptable speech models to achieve performance constraints imposed on the noise compensation system 116, specifically, or the ASR 108 more generally.

In the same way that adapted user speech models may improve performance of the noise compensation system 116, the performance of the noise compensation system 116 also may be improved by using a noise model that has been trained or otherwise adapted to the environmental audio that typically surrounds the user. As with the speech samples, in an environment such as the system 100, samples of the environmental audio that typically surrounds the user may not be readily available initially. Thus, in one implementation, the ASR 108 selects a surrogate noise model from one or more surrogate noise models 126*b* when a user initially sends a voice search query or if there is not an adapted noise model for that user for some other reason. The selected surrogate noise model may be a noise model that is determined to be a reasonable approximation of the expected environmental audio surrounding the user based on known or determined information. The selected surrogate noise model is used to perform the noise compensation on the initial audio signal. As the user submits subsequent voice search queries, some or all of the audio signals sent with those queries is used to adapt the selected surrogate noise model into an adapted noise model that is specific to that user (that is, models the characteristics of the typical ambient sounds surrounding the user when submitting search queries), which is used for the noise compensation of those subsequent audio signals.

For example, in one implementation, when a subsequent audio signal is received, the ASR 108 determines whether the environmental or background audio is below a certain threshold. If not, then the audio signal is used to adapt the surrogate noise model, or further adapt an adapted noise model, to the particular user. In some implementations, a received audio signal may be used to adapt a surrogate or adapted noise model regardless of whether the background audio is above a certain threshold.

In some implementations, to insure that a sample of the environmental audio, without user utterances, is obtained and can be used to adapt a noise model, the voice search query application on the mobile device 104 may start recording before the user utters the search query and/or may continue recording after the user finishes uttering the search query. For example, the voice search query application may capture two seconds of audio before and/or after the user utters the search query to insure that a sample of environmental audio is obtained.

In some implementations a single surrogate noise model may be selected and adapted into a single adapted noise model for the user across the different environments that the user uses the voice search application. In other implementations, however, adapted noise models may be developed for the various locations that the user frequents when using the voice search application. For example, different noise models may be developed for different locations and stored as surrogate noise models 120*a*. The user's location when submitting a voice search query may be sent by the mobile device 104 to the ASR 108, or the user's location when submitting the voice search query may otherwise be determined. When the initial audio signal for a given location is received, then a surrogate noise model for that location may be selected and, as further voice search queries are received from that location, the associated audio signal may be used to adapt that particular noise model. This may occur for each of the different locations at which the user is located when performing a voice search query, thereby resulting in multiple, adapted noise models for the user, with each of the models being specific to a certain location. Location-specific noise models may be deleted after a defined time period of non-use (e.g., the user has not performed a voice search query in that location for a specified time).

The location of the user when submitting a voice search query, the location associated with a given noise model, and the location associated with a given speech model each may be defined with various levels of granularity, the most specific being latitudinal and longitudinal navigational coordinates or an area closely bounded (e.g., a quarter mile or smaller) by navigational coordinates. Alternatively, the location can be provided using a region identifier, such as a state name or identifier, city name, idiomatic name (e.g., "Central Park"), a country name, or the identifier of arbitrarily defined region (e.g., "cell/region ABC123"). In some implementations, rather than a geographically-specific location, the location can represent a type of location such as, in some examples, a beach, a downtown metro, an amusement park, inside a moving vehicle, on a boat, inside a building, outdoors, a rural area, an underground location (e.g., subway, parking facility, etc.), a street level location, inside a tall (skyscraper) building, or in a forest. The levels of granularity may be the same or different among the location of the user when submitting a voice search query, the location associated with a given noise model, and the location associated with a given speech model.

The noise models (whether surrogate 120a or adapted 120b) may be implemented as, for example, a Hidden Markov Model (HMM) or a Gaussian Mixture Model (GMM). The user speech models may be trained or otherwise adapted using an Expectation-Maximization algorithm.

As discussed above, in some implementations, the user may be identified specifically while in others the device may be used as a surrogate for the user. Thus, similar to the indexing of the speech models, the adapted noise models may be indexed by a user identifier that corresponds to the identified user when the user can be identified specifically or may be indexed based on a device identifier that corresponds to the device used to submit the voice search query when the user can not be identified specifically.

Figure 2:
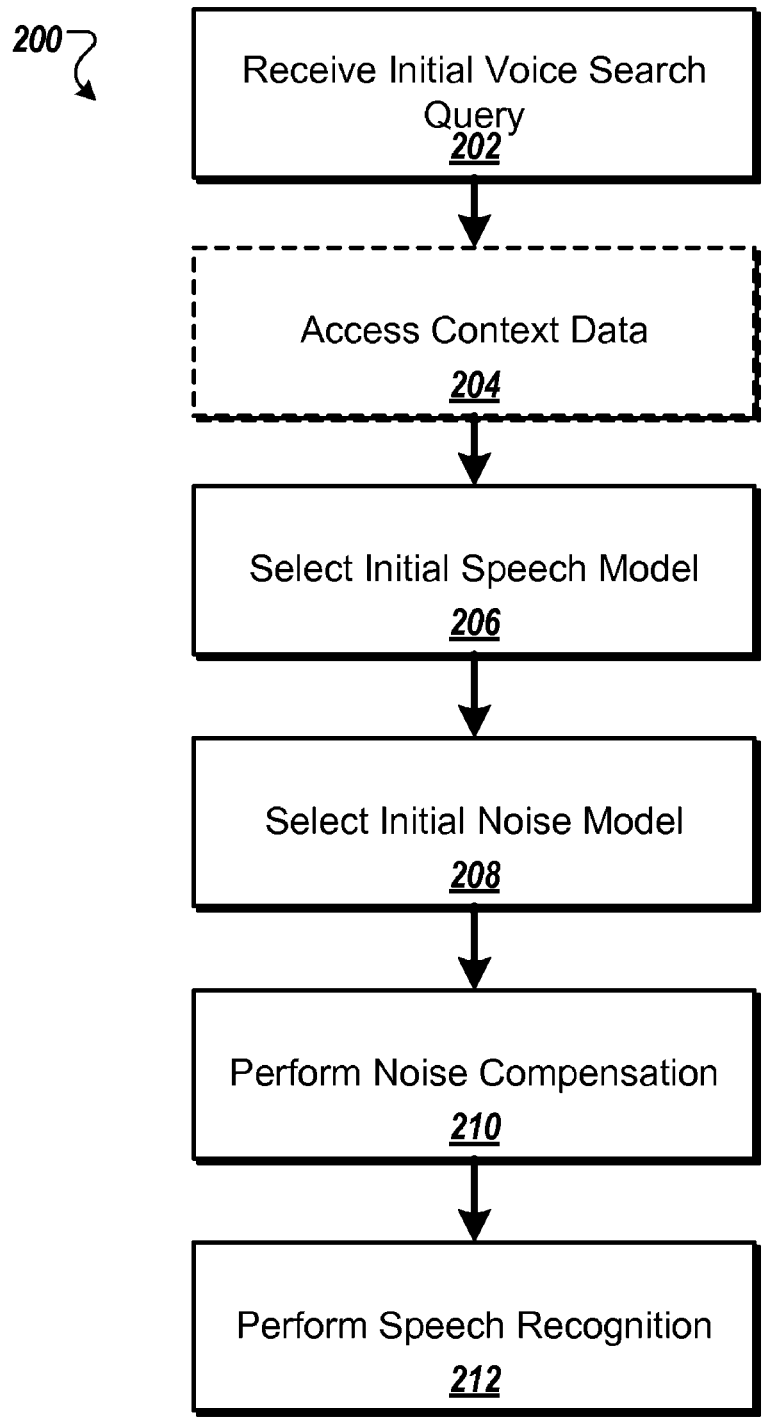
FIG. 2 is a flow chart showing an example of a process.
Figure 3:
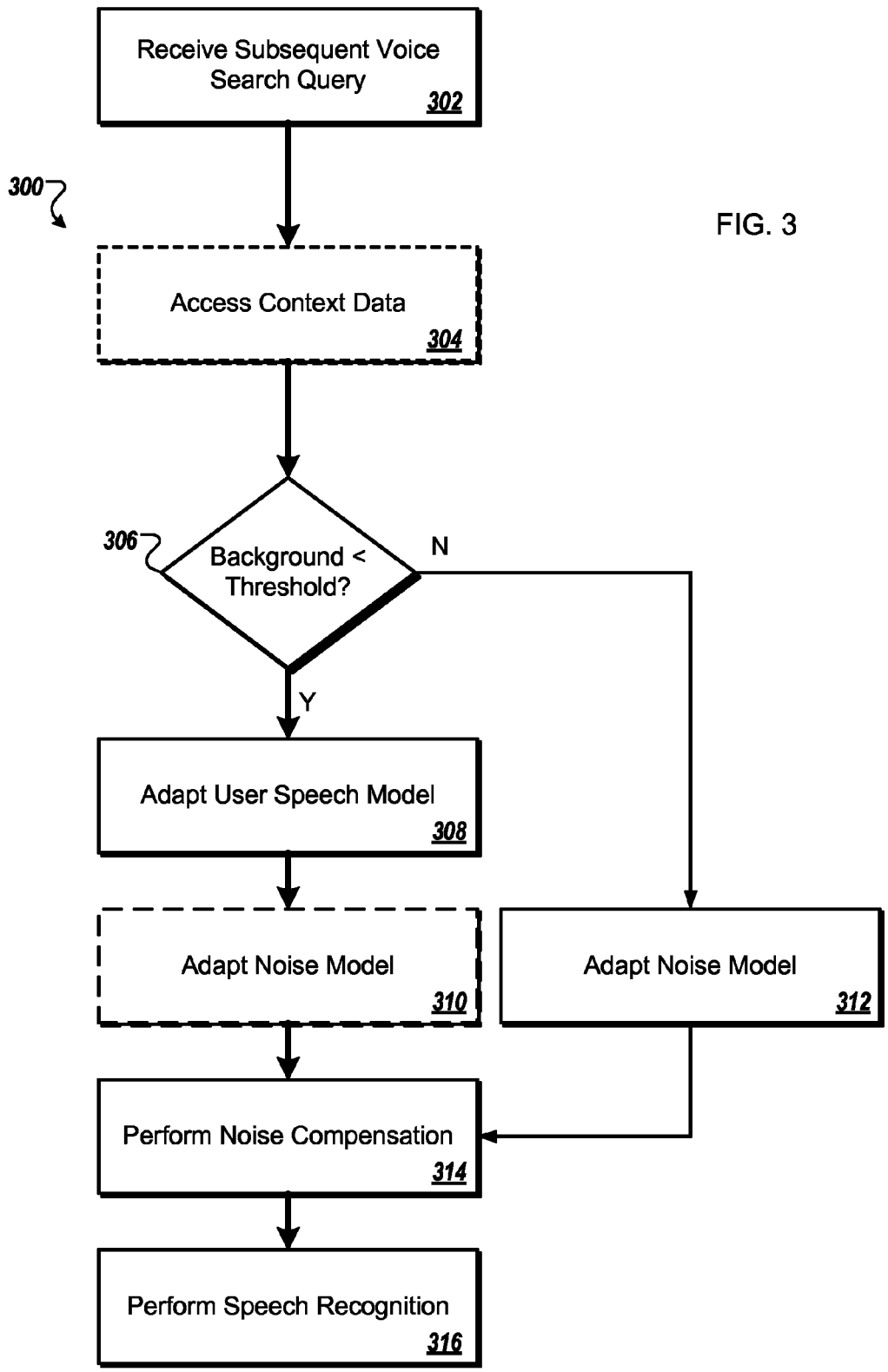
FIG. 3 is a flow chart showing another example of a process.

FIG. 2 is a flowchart showing an example of a process 200 that may be performed when an initial voice search query from a user or device is received, while FIG. 3 is a flowchart showing an example of process 300 that may be performed when subsequent voice search queries are received from the user or device. The following describes components of system 100 as performing processes 200 and 300, but other components of system 100, or another system, may perform processes 200 or 300.

Referring to FIG. 2, the ASR 108 receives an initial voice search query from a device, such as mobile device 104 (202). The initial voice search query may be initial because the voice search query is the first voice search query received for the specific user or device, because the voice search query is the first one received from the particular location at which the voice search query was submitted, or because an adapted user speech model or an adapted noise model (or both) does not exist for the user or device for some other reason (e.g., the model was deleted because the model was not used for a certain period of time).

The voice search query includes an audio signal that is composed of a user audio signal and an environmental audio signal. The user audio signal contains one or more utterances spoken by the user into the microphone of the mobile device 104 and, potentially, environmental audio. The environmental audio signal contains only environmental audio. As described below, the voice search query also may include context information.

When employed, the ASR 108 accesses context information about the voice search query (204). The context information, for example, can provide an indication of conditions related to the audio signal in the voice search query. The context information may include time information, date information, data referencing a speed or an amount of motion measured by the particular mobile device during recording, other device sensor data, device state data (e.g., Bluetooth headset, speaker phone, or traditional input method), a user identifier if the user opts to provide one, or information identifying the type or model of mobile device.

The context information also may include a location at which the voice search query was submitted. The location can be determined, for example, through the user's calendar schedule, derived from user preferences (e.g., as stored in a user account of the ASR engine 108 or the search engine 106) or a default location, based upon past locations (e.g., the most recent location calculated by a Global Positioning System (GPS) module of the device used to submit the query, for example, mobile device 104), explicitly provided by the user when submitting the voice query, determined from the utterances, calculated based upon transmission tower triangulation, provided by a GPS module in the mobile device 104 (e.g., the voice search application may access the GPS device to determine a location and send the location with the voice search query), or estimated using dead reckoning. If sent by the device, the location information can include accuracy information specifying how accurate the location information is.

The ASR 108 may use such context information to assist in speech recognition, for example, by using the context information to select a particular variation of the speech recognition system or to select appropriate surrogate user speech models or surrogate noise models. The ASR 108 may pass such context information to search engine 106 to improve the search results. Some or all of the context information may be received with the voice search query.

If an adapted user speech model for the user does not exist, the ASR 108 selects an initial, or surrogate, user speech model and associates that initial user speech model with the user or device (e.g., depending on whether the user can be specifically identified) (206). For example, as described above, the ASR 108 may select one of several available surrogate user speech models.

The selected surrogate user speech model may be a user speech model that is determined to be a reasonable approximation of the user's speech characteristics based on known or determined information, even though the selected surrogate user speech model has not been adapted with any samples of the user's speech. For example, in one implementation, there may be two surrogate user speech models: one for male voices and one for female voices. The gender of the user may be determined and the appropriate surrogate user speech model (male or female) may be selected based on the likely gender of the user. The gender of the user may determined, for example, by analyzing the audio signal that is received with the initial voice search query or based on information, for instance, in information that has voluntarily been submitted by the user and included in a profile of the user.

Additionally, or alternatively, adapted user speech models for other users, such as the users of mobile devices 102a-102c may be used as surrogate user speech models. When the initial voice search query is received, a similarity metric that represents a similarity between an expected model for the user that submitted the initial search query and the adapted user speech models (corresponding to other users) already stored in datastore 111 may be determined based on the initial audio signal included with the initial search query. For example, if the models are based on constrained maximum likelihood linear regression techniques, the similarity metric might be the L2-Norm of the difference between the models (the sum of squared difference for each coefficient). In the situation in which GMM techniques are used, the similarity metric may be the Kullback-Leibler divergence between the two probability density functions, or if one model is a GMM and the expected model from a single utterance is just a point in space, it might be the probability density of the GMM at that point in space. In other implementations using GMMs, the similarity metric may be, for example, the distance between the mean of each GMM, or the distance between the means normalized by some norm of the covariance matrices.

The adapted user speech model that is closest to the expected model of the user, as indicated by the similarity metrics, may be chosen as the surrogate user speech model for the user that submitted the initial voice search query. As an example, when the user of device 104 submits an initial voice search query, the ASR 108 may determine a similarity metric representing the similarity between an expected user speech model for the user of the device 104 and an adapted user speech model for the user of device 102a. Similarly, the ASR 108 may determine a similarity metric representing the similarity between an expected user speech model for the user of the device 104 and an adapted user speech model for the user of device 102b. If the similarity metrics indicate that the expected model for the user of the device 104 is more similar to the model for the user of device 102a than the model for the user of device 102b, then the model for the user of device 102a may be used as the surrogate user speech model for the user of the device 104.

As a particular example for implementations employing GMMs, the voice search query may be compose of an utterance containing speech and environment signals. This query may be segmented into, for example, 25 ms segments, with each segment being either speech or purely environment. For each segment, a feature vector $x_t$ is computed, with the vectors corresponding to speech being designated as $x_s$. For each potential surrogate model that we have in our data store, $M_i$, we compute the likelihood of each of the vectors:

$$p(x_t, i) = p(x_t \mid i)p(i) = \sum_j \pi_j N\left(x_t; \mu_{i,j}, \sum_{i,j}\right)p(i)$$

This is the likelihood computation of a GMM and p(i) is the prior for that surrogate model. Assuming independence of observations, the probability of the set of speech vectors $x_s$ can be expressed as:

$$p(x_s, i) = \prod_s \left[\sum_j \pi_j N\left(x_s; \mu_{i,j}, \sum_{i,j}\right)p(i)\right]$$

where $x_s$ is the set of speech vectors.

The conditional probability for class i given the observations $x_s$ is:

$$p(i \mid x_s) = p(x_s, i)/p(x_s)$$

where $$p(x_s) = \sum_i p(x_s, i)$$

The conditional probability can be used as the similarity metric between the current utterance and a particular surrogate speech model $M_i$.

A surrogate model with the highest conditional probability may be chosen:

$$model_{index} = \text{ArgMax}(p(i \mid x_s))i$$

The contextual information, such as an expected language or accent of the user, may be used by itself or in combination with the other techniques described above to select a surrogate user speech model. For example, multiple surrogate user speech models may be stored for different languages and/or accents. The location of the user when submitting the voice search query may be used by the ASR 108 to determine an expected language or accent, and a surrogate user speech model corresponding to the expected language and/or accent may be selected. Similarly, language and/or locale information for the user may be stored, for example, in a profile of the user and used to select a surrogate user speech model that corresponds to the language and/or accent of the user.

If an adapted user speech model already exists, for example, because the voice search query is an initial one for the particular location, but not for the user or device, then action 206 may be skipped, or may be replaced with the further adapting of the adapted user speech model. For example, the audio signal received with the initial voice search query may be assessed to determine whether the background audio is below a certain threshold and, if so, then the audio signal may be used to further train or otherwise adapt the adapted user speech model.

The ASR 108 selects an initial, or surrogate, noise model and associates that initial noise model with the user or device (e.g., depending on whether the user can be specifically identified) (208). The selected surrogate noise model may be a noise model that is determined to be a reasonable approximation of the expected environmental audio surrounding the user based on known or determined information. For example, surrogate noise models may be developed for different, standard kinds of environmental conditions such as in-car, at an airport, at home, or at a bar/restaurant. Data from other users in the system may be used to develop surrogate noise models. For example, if a certain duration (e.g., 10 minutes) of low-noise data has been collected from a user, then this data may be used to generate a surrogate model. When the initial audio signal is received, a similarity metric that represents a similarity between an expected noise model and the standard surrogate noise models may be determined based on the initial audio signal and one of the standard surrogate noise models may be selected based on the similarity metric (using, for example, techniques similar to those described above with respect to selecting a surrogate user model). For example, the expected noise model may be determined based on the environmental audio signal. A set of surrogate noise models (for example, 100) that exceed a particular dissimilarity threshold (for example, determined based on the KL distance) may be maintained as standard surrogate models, and the surrogate model used may be chosen from this set using a similarity metric, as described. This may minimize computation when selecting a surrogate noise model.

Additionally, or alternatively, different noise models may be developed for different locations and stored as surrogate noise models 120a. For example, a noise model for Location A 132a and Location B 132b may be developed and stored as surrogate noise models 120a. The noise models for specific locations may be developed based on previous voice search queries initiated by other users in those locations. A noise model for Location B 132b, for instance, may be developed based on the audio signal 130b received by the ASR 108 as part of a voice search query from the user of device 102b while in Location B 132b and the audio signal 130c received by the ASR 108 as part of a voice search query from the user of device 102c while in Location B 132b. A noise model for Location A 132a, for instance, may be developed based on the audio signal 130a received by the ASR 108 as part of a voice search query from the user of device 102a while in Location A.

When an initial audio signal is received, a surrogate noise model may be selected based on the location of the user. For example, when the user of mobile device 104 submits an initial voice search from Location B 132b, the ASR 108 may select a surrogate noise model for Location B. In some implementations, the voice search application on the mobile device 104 may access a GPS device in the mobile device to determine a location of the user and send the location information to the ASR 108 with the voice search query. The location information may then be used by the ASR 108 to determine the appropriate surrogate noise model based on the location. In other implementations, when the initial audio signal is received, a similarity metric that represents a similarity between an expected noise model and the location-specific surrogate noise models already stored in datastore 111 may be determined based on the initial audio signal and one of the location-specific surrogate noise models may be selected based on the similarity metric.

Using the initial (or adapted) user speech model and the initial noise model, the noise compensation system 116 of ASR 108 performs noise compensation on the audio signal received with the voice search query to remove or reduce background audio in the audio signal, thereby producing a filtered audio signal (210). For example, an algorithm, such as the Algonquin algorithm, as described, for example, in ALGONQUIN: Iterating Laplace's Method to Remove Multiple Types of Acoustic Distortion for Robust Speech Recognition, Eurospeech 2001—Scandinavia, may be used to perform noise compensation using the initial user speech model and the initial noise model.

The speech recognition system performs speech recognition on the filtered audio signal to transcribe the utterances in the audio signal into one or more candidate transcriptions (210). A search query can be executed using the one or more candidate transcriptions. In some implementations, the ASR 108 may use the context information to select a particular variation of the speech recognition system for performing the speech recognition. For example, the expected or known language and/or accent of the user may be used to select an appropriate speech recognition system. The location of the user when submitting the voice search query may be used to determine an expected language of the user, or the language of the user may be included in a profile of the user.

Referring to FIG. 3, the ASR 108 receives a subsequent voice search query from the device, such as mobile device 104 (302). The subsequent voice search query may be subsequent because the voice search query is received after a previous voice search query for the specific user or the device, or because a surrogate or adapted user speech model or noise model exists for the user or device.

The subsequent voice search query includes an audio signal that is composed of a user audio signal and an environmental audio signal. The user audio signal contains one or more utterances spoken by the user into the microphone of the mobile device 104 and, potentially, environmental audio. The environmental audio signal contains only environmental audio. As described below, the voice search query also may include context information.

When employed, the ASR 108 accesses context information about the voice search query (304). The ASR 108 may use such context information to assist in speech recognition, for example, by using the context information to select a particular variation of the speech recognition system. Additionally, or alternatively, the context information may be used to assist with the selection and/or adapting of the surrogate or adapted user speech model and/or adapted or surrogate noise model. The ASR 108 may pass such context information to search engine 106 to improve the search results. Some or all of the context information may be received with the voice search query.

The ASR 108 determines whether the environmental audio in the audio signal received with the voice search query is below a defined threshold (306). For example, a voice activity detector can be used to determine the user audio signal and the environmental audio signal in the received audio signal. The ASR 108 can then determine the energy in the environmental audio signal and compare the determined energy to a threshold energy. If the energy is below the threshold energy, then the environmental audio is considered to be below the defined threshold. In another example, the ASR 108 may determine the energy in the user audio signal, determine the energy in the environmental audio signal, and then determine the ratio of the energy in the user audio signal to the energy in the environmental audio signal. This ratio may represent the signal to noise ratio (SNR) of the audio signal. The SNR of the audio signal may then be compared to a threshold SNR and, when the SNR of the audio signal is above the threshold SNR, then the environmental audio is considered to be below the defined threshold.

If the environmental audio in the audio signal received with the voice search query is not below the defined threshold, then the surrogate (or adapted) noise model is adapted using the audio signal to generate an adapted noise model (312). In some implementations, the particular noise model to be adapted is selected based on the location of the user. For instance, when different noise models are used for the different locations from which the user frequently submits voice search queries, the ASR 108 may use the location of the user or device to select the surrogate or adapted noise model for that location.

The noise model may be adapted on the whole audio signal, or the environmental audio signal may be extracted and used to adapt the noise model, depending on the particular implementation of the noise model and the speech enhancement or speech separation algorithm. Techniques such as hidden Markov models or Guassian mixture models may be used to implement the user speech model, and techniques such as Expectation-Maximization may be used to adapt the user speech model.

If the environmental audio in the audio signal received with the voice search query is below the defined threshold, then the audio signal is used to adapt the surrogate user speech model previously selected (if the surrogate has not been previously adapted into an adapted user speech model) or the adapted user speech model (308). The user speech model may be adapted on the whole audio signal, or the user audio signal may be extracted and used to adapt the user speech model, depending on the particular implementation of the user speech model. Similar to the noise model, techniques such as hidden Markov models or Gaussian mixture models may be used to implement the user speech model, and techniques such as Expectation-Maximization or maximum a posteriori adaptation (MAP) may be used to adapt the user speech model.

In some implementations, the ASR 108 also trains or otherwise adapts the surrogate or adapted noise model based on the audio signal with the background audio below the threshold (310). While in some implementations the user speech model is only trained or adapted using an audio signal with background audio below the defined threshold, in some instances the noise model may be trained or adapted based on such an audio signal in addition to audio signals with background audio above the threshold, depending on the particular technique used to implement the noise model. For instance, certain noise models may include parameters that reflect aspects of environments with background audio below the threshold and, therefore, such models may benefit from adapting on audio signals with background audio below the threshold.

Using the surrogate or adapted user speech model (depending on whether the surrogate speech model was adapted) and the surrogate or adapted noise model (depending on whether the surrogate noise model was adapted), the noise compensation system 116 of ASR 108 performs noise compensation, in the same fashion as described above, on the audio signal received with the voice search query to remove or reduce background audio in the audio signal, thereby producing a filtered audio signal (314). The speech recognition system performs speech recognition, in the same fashion as described above, on the filtered audio signal to transcribe the utterances in the audio signal into one or more candidate transcriptions (316).

While the process 300 illustrates the noise model and/or user speech model being adapted before being used in noise compensation, the adapting may occur after the noise compensation is performed and the noise compensation may be based on the noise and/or user speech models before those models are further adapted. This may be the case, for example, when the adapting is computationally intensive. In this case, a desired response time to the voice search query may be achieved by using the current noise and user speech models for the noise compensation and updating those based on the new audio signal afterwards.

Figure 4:
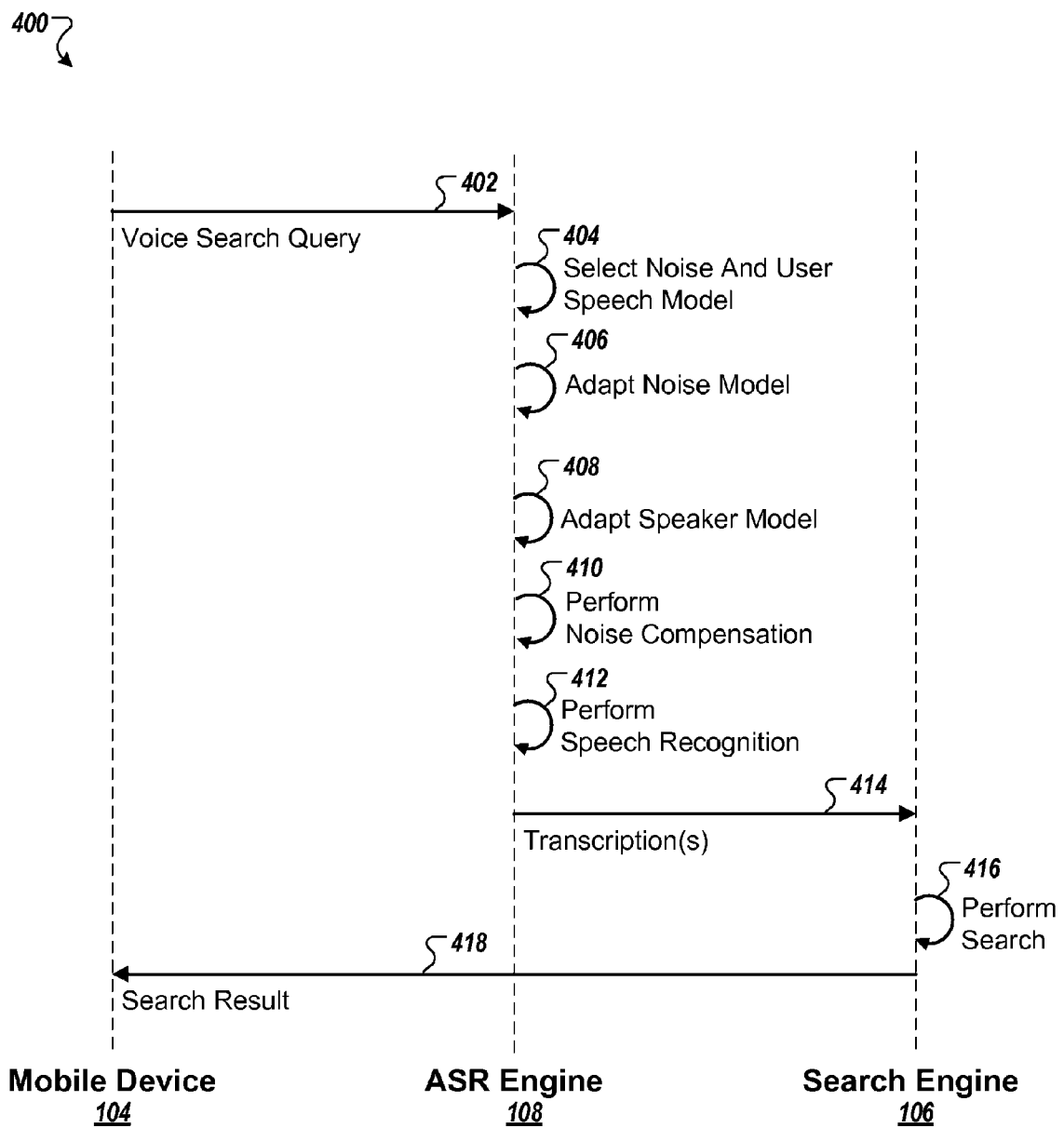
FIG. 4 is a swim lane diagram showing an example of a process.

FIG. 4 shows a swim lane diagram of an example of a process 400 performed by the mobile device 104, the ASR 108, and the search engine 106 for handling voice search queries. The mobile device 104 sends a voice search query to the ASR 108 (402). As described above, the voice search query includes an audio signal that contains an environmental audio signal that includes environmental audio without user utterances and a user audio signal that includes user utterances (and potentially environmental audio). The voice search query also may include context information, such as the context information described above.

The ASR 108 receives the voice search query (402) and selects both noise and user speech models (404). The ASR 108, for example, may select a stored, adapted user speech model based on a user identifier or device identifier included with the voice search query, or otherwise accessible to the ASR 108. Similarly, the ASR 108 may select a stored, adapted noise model based on a user identifier or device identifier included with the voice search query, or otherwise accessible to the ASR 108. In implementations that use different noise models for specific locations, the ASR 108 may select a stored, adapted noise model, from the multiple location-specific adapted noise models, based on the user or device identifier, as well as a location identifier that corresponds to the location of the user when submitting the voice search query. The ASR 108 may ascertain the location information from context information sent in the voice search query, or otherwise available to the ASR 108.

In the event that an adapted user speech model does not exist for the user or device, the ASR 108 selects a surrogate user speech model using, for example, the techniques described above (404). Similarly, if an adapted noise model does not exist for the user or device, or at least not for the particular location of the user when submitting the voice search query, the ASR 108 selects a surrogate noise model using, for example, the techniques described above.

The ASR 108 then uses the audio signal received with the voice search query to adapt the selected user speech model (406) and/or the selected noise model (408) to generate an adapted user speech model or adapted noise model, depending on the background audio in the audio signal. As described above, when the background audio is below a defined threshold, the audio signal is used to adapt the selected user speech model and, in some implementations, the selected noise model. When the background audio is above the defined threshold, then, in some implementations at least, the audio signal is used to adapt the selected noise model only.

The ASR 108 performs noise compensation on the audio signal using the adapted user speech model and the adapted noise model (410) to generate a filtered audio signal that has reduced or removed background audio compared to the received audio signal.

The ASR engine 404 performs speech recognition 416 upon the filtered audio signal to transcribe one or more utterances in the audio signal into textual, candidate transcriptions (412). The ASR engine 404 forwards 418 the generated transcription(s) to the search engine 406 (414). If the ASR engine 404 generated more than one transcription, the transcriptions may optionally be ranked in order of confidence. The ASR engine 404 may optionally provide context data to the search engine 406, such as the geographic location, which the search engine 406 may use to filter or rank search results.

The search engine 406 performs a search operation using the transcription(s) (416). The search engine 406 may locate one or more URIs related to the transcription term(s).

The search engine 406 provides search query results to the mobile device 402 (418). For example, the search engine 406 may forward HTML code which generates a visual listing of the URI(s) located.

A number of implementations have been described. Nevertheless, it will be understood that various modifications may be made without departing from the spirit and scope of the disclosure. For example, the above techniques have been described with respect to performing speech recognition on audio signals in voice search queries, the techniques can be used in other systems, such as computerized voice dictation systems or dialog systems implemented on a mobile or other device. Furthermore, the various forms of the flows shown above may be used, with steps re-ordered, added, or removed. Accordingly, other implementations are within the scope of the following claims.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims can be performed in a different order and still achieve desirable results.

What is claimed is:

1. A system comprising:
one or more processing devices; and
one or more storage devices storing instructions that, when executed by the one or more processing devices, cause the system to:
receive an audio signal generated by a device based on audio input from a user, the audio signal including background audio and one or more user utterances recorded by the device, the audio signal comprising a portion that includes background audio without utterances of the user;

identify the user or the device based on an identifier for the user or the device;

determine a location of the user when the one or more utterances are recorded;

determine that a set of stored noise models does not include an adapted noise model that is adapted for the user or the device and that is associated with both (i) the determined location and (ii) the identifier for the user or the device;

select a surrogate noise model in response to determining that the set of stored noise models does not include an adapted noise model that is adapted for the user or the device and that is associated with both (i) the determined location and (ii) the identifier for the user or the device;

generate a filtered audio signal with reduced background audio compared to the received audio signal using the selected surrogate noise model;

adapt the surrogate noise model based on the received audio signal to generate a first adapted noise model that models characteristics of background audio surrounding the user at the location; and store the first adapted noise model as one of a plurality of adapted noise models that are specific to the identified user or device, each of the plurality of adapted noise models being associated with a different corresponding location, each of the plurality of adapted noise models having been adapted based on audio recorded by the device at the corresponding location with which the adapted noise model is associated, each of the plurality of adapted noise models being stored in association with the identifier for the user or the device and with its corresponding location such that when utterances of the user are recorded by the device at the different corresponding locations, the adapted noise model associated with the location where the device recorded the utterances is used to recognize the utterances of the user.

2. The system of claim 1, wherein:

to determine the location of the user when the one or more utterances are recorded, the instructions, when executed, cause the system to determine a geographical location of the user when the one or more utterances are recorded; and to store the first adapted noise model, the instructions, when executed, cause the system to store the first adapted noise model as a noise model for the user for audio input recorded at the geographical location.

3. The system of claim 1, wherein:

to determine the location of the user when the one or more utterances are recorded, the instructions, when executed, cause the system to determine a type of location where the user is located when the one or more utterances are recorded; and to store the first adapted noise model, the instructions, when executed, cause the system to store the first adapted noise model as a noise model for the user for audio input recorded at locations of the same type as the determined type of location.

4. The system of claim 1, wherein, to select the surrogate noise model, the instructions, when executed, cause the system to select the noise model based on the determined location.

5. The system of claim 4, wherein, to select the surrogate noise model based on the determined location, the instructions, when executed, cause the system to select the surrogate noise model from among multiple noise models that are each developed to model characteristics of background audio at a different corresponding location based on audio input that is recorded at the corresponding location by other users.

6. The system of claim 5, wherein the audio input that is recorded at the determined location by other users comprises voice queries submitted by the other users.

7. The system of claim 1, wherein the instructions further comprise instructions that, when executed, cause the system to:

receive a second audio signal generated by the device based on second audio input from the user, the audio signal including at least second background audio and one or more second user utterances recorded by the device;

determine that, when the one or more second utterances are recorded, the user is at the determined location where the one or more first utterances were recorded; and perform noise compensation on the second audio signal using the first adapted noise model in response to determining that, when the one or more second utterances are recorded, the user is at the determined location where the one or more first utterances were recorded.

8. The system of claim 1, wherein the instructions further comprise instructions that, when executed, cause the system to:

receive a second audio signal generated by the device based on second audio input from the user, the audio signal including at least second background audio and one or more second user utterances recorded by the device;

determine a second location of the user when the one or more second utterances are recorded, the second location being different from the location of the user when the one or more first utterances are recorded;

select, from among the plurality of adapted noise models, a second noise model based on the second location, the second location being the corresponding location for second noise model, and the second noise model having been adapted based on audio recorded by the device at the second location; and perform noise compensation on the second audio signal using the second noise model.

9. The system of claim 1, wherein the instructions further comprise instructions that, when executed, cause the system to:

access a user speech model associated with the user that models speech characteristics of the user; and perform noise compensation on the received audio signal using the user speech model and the selected noise model.

10. The system of claim 9, wherein:

the instructions comprise instructions that, when executed, cause the system to determine that the background audio in the audio signal is above a defined threshold; and to adapt the selected noise model, the instructions, when executed, cause the system to adapt the selected noise model in response to determining that the background audio in the audio signal is above the defined threshold.

11. The system of claim 1, wherein, to select the surrogate noise model, the instructions include instructions that, when executed by the one or more processing devices, cause the system to:

receive an initial audio signal that includes at least an initial user audio portion that corresponds to one or more user utterances recorded by the device;

determine similarity metrics between multiple surrogate noise models and an expected noise model for the user determined based on the initial audio signal; and select the surrogate noise model, from among multiple surrogate noise models, based on the similarity metrics.

12. The system of claim 11 wherein each of the multiple surrogate noise models model characteristics of background audio in a particular location.

13. The system of claim 11, wherein each of the multiple surrogate noise models model characteristics of background audio in a particular kind of environmental condition.

14. The system of claim 1, wherein, to select the surrogate noise model, the instructions include instructions that, when executed by the one or more processing devices, cause the system to:

receive context information about the device; and
select the surrogate noise model, from among the multiple surrogate noise models, based on the context information.

15. The system of claim 1, wherein, to store the first adapted noise model, the instructions, when executed, cause the system to index the first adapted noise model based on the identifier for the user or the device.

16. The system of claim 1, wherein, to determine the location of the user when the one or more utterances are recorded, the instructions, when executed, cause the system to:

receive, from the device, location data indicating a location determined by a Global Positioning System module of the device; and
determine the location based on the received location data.

17. The system of claim 1, wherein, to determine the location of the user when the one or more utterances are recorded, the instructions, when executed, cause the system to determine the location based on at least one of: the user's calendar schedule; user preferences for the user; a prior location of the user; user input provided by the user; transmission tower triangulation; and dead reckoning estimation.

18. A computer-implemented method comprising:

receiving an audio signal generated by a device based on audio input from a user, the audio signal including background audio and one or more user utterances recorded by the device, the audio signal comprising a portion that includes background audio without utterances of the user;

identifying the user or the device based on an identifier for the user or the device;

determining a location of the user when the one or more utterances are recorded;

determining that a set of stored noise models does not include an adapted noise model that is adapted for the user or the device and that is associated with both (i) the determined location and (ii) the identifier for the user or the device;

selecting a surrogate noise model in response to determining that the set of stored noise models does not include an adapted noise model that is adapted for the user or the device and that is associated with both (i) the determined location and (ii) the identifier for the user or the device;

generating a filtered audio signal with reduced background audio compared to the received audio signal using the selected surrogate noise model;

adapting the surrogate noise model based on the received audio signal to generate a first adapted noise model that models characteristics of background audio surrounding the user at the location; and storing the first adapted noise model as one of a plurality of adapted noise models that are specific to the identified user or device, each of the plurality of adapted noise models being associated with a different corresponding location, each of the plurality of adapted noise models having been adapted based on audio recorded by the device at the corresponding location with which the adapted noise model is associated, each of the plurality of adapted noise models being stored in association with the identifier for the user or the device and with its corresponding location such that when utterances of the user are recorded by the device at the different corresponding locations, the adapted noise model associated with the location where the device recorded the utterances is used to recognize the utterances of the user.

19. A computer storage medium encoded with a computer program, the program comprising instructions that when executed by one or more computers cause the one or more computers to perform operations comprising:

receiving an audio signal generated by a device based on audio input from a user, the audio signal including background audio and one or more user utterances recorded by the device, the audio signal comprising a portion that includes background audio without utterances of the user;

identifying the user or the device based on an identifier for the user or the device;

determining a location of the user when the one or more utterances are recorded;

determining that a set of stored noise models does not include an adapted noise model that is adapted for the user or the device and that is associated with both (i) the determined location and (ii) the identifier for the user or the device;

selecting a surrogate noise model in response to determining that the set of stored noise models does not include an adapted noise model that is adapted for the user or the device and that is associated with both (i) the determined location and (ii) the identifier for the user or the device;

generating a filtered audio signal with reduced background audio compared to the received audio signal using the selected surrogate noise model;

adapting the surrogate noise model based on the received audio signal to generate a first adapted noise model that models characteristics of background audio surrounding the user at the location; and storing the first adapted noise model as one of a plurality of adapted noise models that are specific to the identified user or device, each of the plurality of adapted noise models being associated with a different corresponding location, each of the plurality of adapted noise models having been adapted based on audio recorded by the device at the corresponding location with which the adapted noise model is associated, each of the plurality of adapted noise models being stored in association with the identifier for the user or the device and with its corresponding location such that when utterances of the user are recorded by the device at the different corresponding locations, the adapted noise model associated with the location where the device recorded the utterances is used to recognize the utterances of the user.

* * * * *